United States Patent
Rice et al.

(10) Patent No.: US 10,883,894 B2
(45) Date of Patent: Jan. 5, 2021

(54) CONDUIT FATIGUE MANAGEMENT SYSTEMS AND METHODS

(71) Applicant: OneSubsea IP UK Limited, London (GB)

(72) Inventors: Phillip Adam Rice, Turriff (GB); Robert Stewart James Large, Aberdeen (GB); Andrew Edward Heaney, Westhill (GB); Bernard Theron, Gjovik (NO)

(73) Assignee: OneSubsea IP UK Limited, London (GB)

( * ) Notice: Subject to any disclaimer, the term of this patent is extended or adjusted under 35 U.S.C. 154(b) by 495 days.

(21) Appl. No.: 15/703,132

(22) Filed: Sep. 13, 2017

(65) Prior Publication Data

US 2018/0080850 A1 Mar. 22, 2018

Related U.S. Application Data

(60) Provisional application No. 62/395,532, filed on Sep. 16, 2016.

(51) Int. Cl.
| | |
|---|---|
| *E21B 17/20* | (2006.01) |
| *E21B 19/22* | (2006.01) |
| *E21B 17/01* | (2006.01) |
| *E21B 47/00* | (2012.01) |
| *G01M 5/00* | (2006.01) |
| *E21B 47/001* | (2012.01) |
| *E21B 47/007* | (2012.01) |

(52) U.S. Cl.
CPC ......... *G01M 5/0041* (2013.01); *E21B 17/017* (2013.01); *E21B 17/20* (2013.01);
(Continued)

(58) Field of Classification Search
CPC ....... E21B 19/22; G01M 5/00; G01M 5/0041; G01M 5/0058; G01M 17/01;
(Continued)

(56) References Cited

U.S. PATENT DOCUMENTS

| | | | | |
|---|---|---|---|---|
| 5,794,356 A | * | 8/1998 | Raab | G01B 5/008 33/1 PT |
| 6,408,948 B1 | * | 6/2002 | Fontana | B63B 21/502 166/341 |

(Continued)

FOREIGN PATENT DOCUMENTS

WO 2016130151 A1 8/2016

OTHER PUBLICATIONS

Beard et al., "Deepwater Hydraulic Well Intervention at Tahiti: A Creative Hybrid Solution", OTC 26984, Offshore Technology Conference, May 2-5, 2016, 20 pages.

*Primary Examiner* — Gregory J Toatley, Jr.
*Assistant Examiner* — Lynda Dinh
(74) *Attorney, Agent, or Firm* — Helene Raybaud (57) ABSTRACT

A technique facilitates monitoring and managing fatigue related a flexible conduit deployed from a surface vessel. Movements of the surface vessel may be measured to obtain vessel movement/position data. Based on this data, a flexible conduit bend profile may be determined via a computer-based data processing system. The flexible conduit bend profile may then be used to provide a flexible conduit fatigue profile for assessment of the flexible conduit in light of the environmental conditions. In some embodiments, the fatigue profile and assessment of the flexible conduit may be based on both functional loading and environmental loading.

17 Claims, 5 Drawing Sheets

(52) U.S. Cl.
CPC ............ *E21B 19/22* (2013.01); *E21B 47/001* (2020.05); *E21B 47/007* (2020.05); *G01M 5/0058* (2013.01); *G01M 5/00* (2013.01)

(58) Field of Classification Search
CPC .... G01M 17/017; G01M 17/20; G01M 47/00; G01M 47/0001; G01M 47/0006
See application file for complete search history.

(56) References Cited

U.S. PATENT DOCUMENTS

| | | | | |
|---|---|---|---|---|
| 6,457,534 | B1* | 10/2002 | Rolovic | E21B 19/22 166/381 |
| 6,834,724 | B2* | 12/2004 | Headworth | E21B 17/01 166/384 |
| 8,736,821 | B2* | 5/2014 | Smith | G01M 5/0025 356/32 |
| 2003/0128138 | A1* | 7/2003 | Grunder | B63B 21/00 340/986 |
| 2003/0222871 | A1* | 12/2003 | Brombolich | G06F 17/5018 345/427 |
| 2011/0155289 | A1* | 6/2011 | Iwamatsu | B21C 37/0811 148/519 |
| 2013/0193256 | A1* | 8/2013 | Hawkes | B65H 75/425 242/557 |
| 2014/0190268 | A1* | 7/2014 | Hovhanessian | G01M 5/0025 73/812 |
| 2014/0207390 | A1 | 7/2014 | Zheng et al. | |
| 2014/0262337 | A1* | 9/2014 | Cravero | B21C 37/0826 166/381 |
| 2016/0362973 | A1* | 12/2016 | Turner | E21B 47/0006 |

\* cited by examiner

CONDUIT FATIGUE MANAGEMENT SYSTEMS AND METHODS

CROSS-REFERENCE TO RELATED APPLICATION

The present document is based on and claims priority to U.S. Provisional Application Ser. No. 62/395,532, filed Sep. 16, 2016, which is incorporated herein by reference in its entirety.

BACKGROUND

In offshore well systems such as production and well intervention systems, various operations utilize flexible conduits suspended from a topside vessel disposed at the surface water line. Examples of flexible conduits include coiled tubing and flexible cables. When a flexible conduit is deployed from the topside vessel, the flexible conduit may undergo plastic deformation or low-cycle, high-load fatigue when the flexible conduit is wound or unwound from a cylindrical reel. An example of such a cylindrical reel is a coiled tubing reel used in deploying and retrieving coiled tubing. In various conventional operations, the flexible conduit, e.g. coiled tubing, is restrained within a riser and/or well and is not directly exposed to environmental effects, e.g. forces resulting from movement of the surface vessel. Various fatigue models are available to estimate a working life of coiled tubing for conventional operations in which the coiled tubing is not exposed to environmental effects.

However, in other types of operations the environmental forces can substantially impact the life and performance of the flexible conduit. Consequently, performing subsea operations from a topside vessel can be a highly challenging activity due to the unpredictability of the sea surface and other environmental factors. In unconventional operations, the topside vessel and suspended flexible conduit may encounter many types of dynamic environmental conditions during the subsea operations. Difficulty arises in accounting for the dynamic environmental conditions and the effects of those environmental conditions on the life of the flexible conduit.

SUMMARY

In general, the present disclosure provides a system and methodology for monitoring and managing fatigue related to a flexible conduit deployed from a surface vessel. Movements of the surface vessel may be measured to obtain vessel position data. Based on this movement/position data, a flexible conduit bend profile may be determined via a computer-based data processing system. The flexible conduit bend profile may then be used to provide a flexible conduit fatigue profile for assessment of the flexible conduit in light of the environmental conditions. In some embodiments, the fatigue profile and assessment of the flexible conduit may be based on both functional loading and environmental loading.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology for monitoring and managing fatigue related to a flexible conduit deployed from a surface vessel. The flexible conduit may comprise, for example, coiled tubing or flexible cable deployed via a corresponding reel system from a surface vessel. Currently, flexible conduit fatigue associated with environmental conditions is not adequately monitored and managed in various applications. By way of example, the environmental conditions may result from movements of the surface vessel (and consequent movements of the flexible conduit) due to rough surface conditions.

According to an embodiment, movements of the surface vessel may be measured to obtain vessel position data. For example, a sensor package having appropriate sensors may be positioned to monitor motion of the surface vessel and/or flexible conduit. Examples of such sensors include optical positioning sensors and, in some embodiments, the sensors may be located within or combined with a motion reference unit. Data related to other types of environmental loading also may be collected via various other sensors, such as pressure sensors and temperature sensors.

Based on this data, e.g. movement/position data, a flexible conduit bend profile may be determined via a computer-based data processing system. The flexible conduit bend profile may then be used to provide a flexible conduit fatigue profile for assessment of the flexible conduit in light of the environmental conditions. By way of example, the computer-based data processing system may utilize a stress transfer function or functions applied to the flexible conduit bend profile to provide the flexible conduit fatigue profile. In some embodiments, the fatigue profile and assessment of the flexible conduit may be based on both functional loading, e.g. spooling and unspooling of the flexible conduit, and environmental loading.

Figure 1:
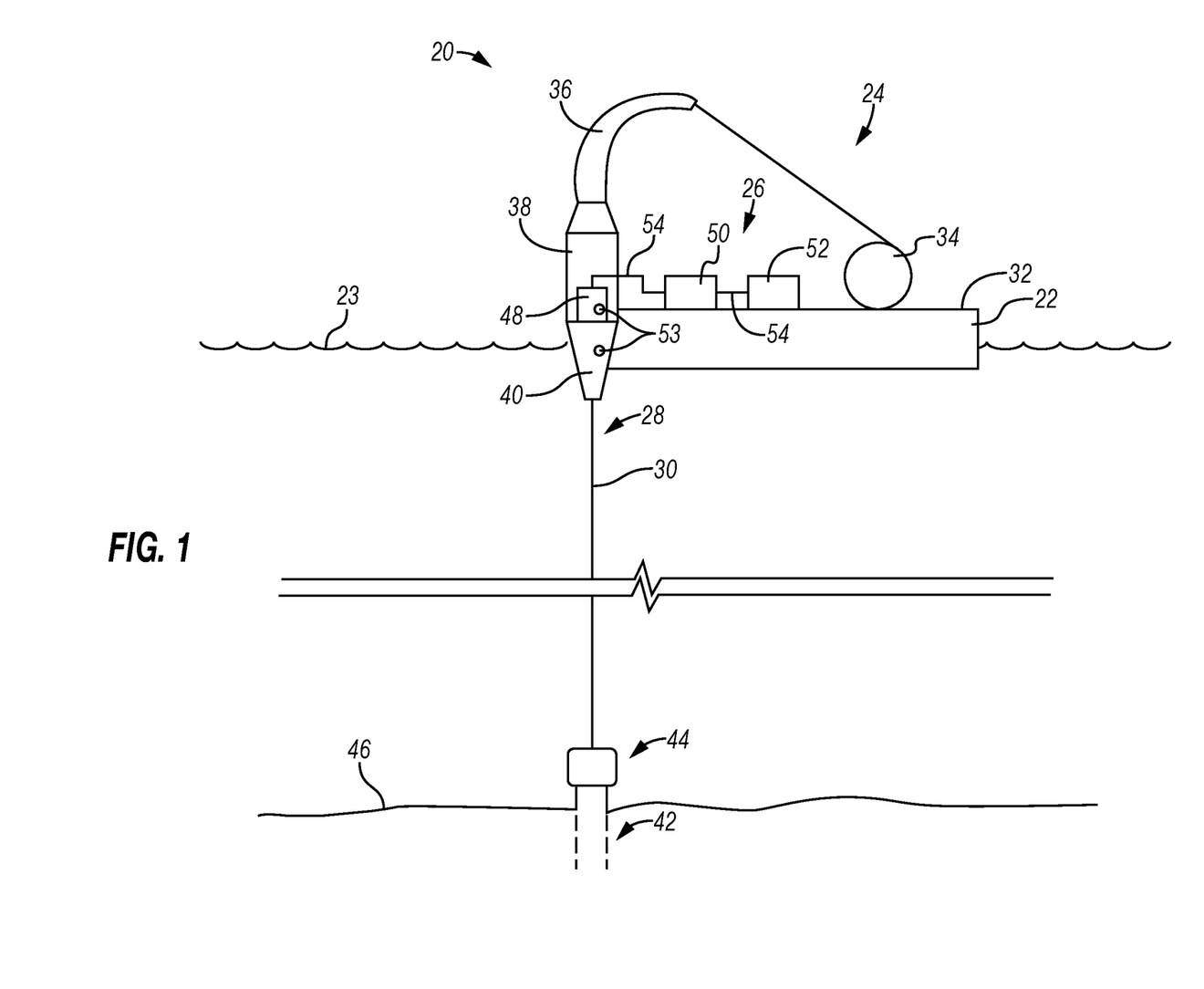
FIG. 1 is a schematic illustration of an example of an offshore well system, according to an embodiment of the disclosure.

Referring generally to FIG. 1, an example of a well system 20 is illustrated. In this embodiment, the well system 20 comprises a surface vessel 22, e.g. a surface ship or surface platform located along a sea surface 23, a flexible conduit system 24, and a fatigue management system 26. The flexible conduit system 24 may comprise a flexible conduit 28 which is deployed, e.g. extended to a subsea location, or retrieved via the flexible conduit system 24. The flexible conduit 28 may comprise coiled tubing, flexible cable, composite pipe, bonded flexible pipe, un-bonded flexible pipe, umbilicals, or other flexible risers or conduits. For purposes of explanation, the illustrated flexible conduit system 24 may be considered a coiled tubing system which deploys and retrieves coiled tubing 30. It should be noted that in some applications the methodology for monitoring and managing fatigue described herein may be applied to less flexible conduits such as substantially rigid risers.

In some embodiments, surface vessel 22 may comprise a surface ship and, in other embodiments, surface vessel 22 may comprise a semi-submersible platform or other type of surface vessel. As illustrated, the surface vessel 22 comprises a deck 32 which supports the flexible conduit system 24 and fatigue management system 26. With respect to deployment of coiled tubing 30, for example, the flexible conduit system 24 may include a reel 34, a guide arch or gooseneck 36, an injector head 38, a bend stiffener 40, and coiled tubing 30.

In this example, the reel 34 is mounted on deck 32 and used to store coiled tubing 30 which is wound about an outer surface of reel 34. From reel 34, the coiled tubing 30 is routed through guide arch 36 which, in turn, guides or directs the coiled tubing 30 along a known radius of curvature and through the vertically oriented injector head 38. Although the illustrated embodiment of flexible conduit system 24 utilizes injector head 38, other embodiments may utilize other types of mechanisms, e.g. a powered reeler, for extending and retracting the coiled tubing 30 or other flexible conduit 28.

The injector head 38 may be used to extend and/or retract coiled tubing 30 with respect to a subsea well 42 disposed generally beneath surface vessel 22. Appropriate subsea well equipment 44 may be positioned at a sea floor 46, and the coiled tubing 30 (or other flexible conduit 28) may be extended into the well 42 or retrieved from the well 42 through subsea well equipment 44, e.g. a wellhead and corresponding equipment. The injector head 38 may comprise wheels and/or other components for physically engaging the coiled tubing 30 during deployment and retrieval so as to help prevent the portion of coiled tubing 30 within injector head 38 from bending.

According to the embodiment illustrated, bend stiffener 40 may be positioned to extend from the injector head 38 and is constructed to increase the bending resistance of the portion of coiled tubing 30 proximate a lower end of the injector head 38. In some embodiments, the bend stiffener 40 may be disposed between zero and 10 meters below the injector head 38. However, other distances may be selected with respect to separation of the injector head 38 and bend stiffener 40.

Given the restriction on bending provided by injector head 38, the injector head 38 may be described as comprising a "hang-off point" where the coiled tubing 30 is held in a static position relative to surface vessel 22. Due to the proximity of the bend stiffener 40 relative to the hang-off point provided by injector head 38, bending (and the associated stress) imparted to coiled tubing 30 may be highest within or adjacent the bend stiffener 40.

Referring again to FIG. 1, fatigue management system 26 may be used to manage a total fatigue of flexible conduit 28 during operation of flexible conduit system 24. For example, the fatigue management system 26 may be used to manage the total fatigue of coiled tubing 30 when flexible conduit system 24 is a coiled tubing system or to manage the total fatigue of other types of flexible conduits 28, e.g. flexible cables. According to an embodiment, the fatigue management system 26 comprises a sensor package 48, a computer system 50, and a peripheral device 52. The various components may have different forms depending on the parameters of a given operation. For example, the sensor package 48 may comprise various types of sensors and may be in the form of a motion reference unit (MRU) or an MRU combined with additional sensors. The computer system 50 may comprise various types of computer-based data processing systems, and the peripheral device 52 may comprise various types of output devices and/or input devices through which information is output from computer system 50 or input to computer system 50. An example of such an output/input device is a graphical user interface.

In some embodiments, the sensor package 48 is in the form of an MRU having a sensor or a plurality of sensors positioned and configured to measure motion of the surface vessel 22 (and thus flexible conduit 28) at or near injector head 38. In this embodiment, the sensor package/MRU 48 obtains sensor data in real-time and may measure, for example, heave, pitch, roll, and yaw of surface vessel 22. However, the sensor package/MRU 48 may comprise various additional sensors 53, e.g. optical sensors, temperature sensors, pressure sensors, load sensors, for measuring other parameters to determine fatigue of the flexible conduit 28. In this example, the computer system 50 receives data in real-time from sensor package/MRU 48 via a signal connection line 54 and processes the data so as to execute fatigue management methodology as described in greater detail herein. The computer system 50 also may be in communication with peripheral device 52 via another signal connection line 54.

Various types of peripheral devices 52 may be used to interface with human operators of well system 20 on surface vessel 22. By way of example, the peripheral device 52 may be used for issuing alarms or instructions based on data provided by sensor package 48 and processed/analyzed via computer system 50. The peripheral device 52 also may be used to input data to computer system 50. For example, the peripheral device 52 may be used to input alarm thresholds corresponding with detection of fatigue limits with respect to flexible conduit 28. The peripheral device 52 also may be used to download updates or other software to computer system 50.

Coiled tubing 30 may be used in well intervention operations and other well operations and may experience both functional loading and environmental loading. The fatigue damage from functional loading may be monitored based on the functional loading experienced by the coiled tubing 30 as the coiled tubing 30 is spooled from reel 34, over gooseneck 36, into well 42 and back again. Examples of other types of functional loading include tensile loading from the spooling and pressure loading. This functional loading or spooling fatigue occurs by exceeding the material elastic yield limit of the coiled tubing 30 (or other flexible conduit 28) and thus operating in the plastic region of the material. Functional loading fatigue may be referred to as low-cycle, high-load fatigue.

In certain conventional subsea applications, coiled tubing is deployed through a riser and constrained in a manner which limits loading on the coiled tubing to functional loading. However, coiled tubing 30 and other flexible conduits 28 are increasingly used in un-restrained open water environments such as the environment illustrated in FIG. 1. This type of usage leads to environmental loading of the flexible conduit 28/coiled tubing 30 due to cycling caused by motions of surface vessel 22. This type of environmental loading induces a high-cycle, low-load fatigue within the elastic material yield region of the coiled tubing 30 (or other flexible conduit). The environmental loading associated with open water induced fatigue increases the risk of failure of the flexible conduit 28. The systems and methodologies described herein enable monitoring and management of this high-cycle, low-load fatigue as well as the overall fatigue due to both functional loading and environmental loading.

For example, fatigue management system 26 may be used for real-time estimation of a remaining useful life of the flexible conduit 28, e.g. coiled tubing 30, when used in an open water environment. According to an embodiment, coiled tubing 30 is supported from surface vessel 22 and subjected to motions induced by environmental conditions. These motions are detected by sensors of sensor package 48, e.g. MRU, and recorded for use by computer system 50. Due to the motions of surface vessel 22 and consequent movement of coiled tubing 30, environmental loading occurs and high-cycle, low-load fatigue damage is inflicted on the coiled tubing 30. The high-cycle, low-load fatigue damage may be calculated and recorded continually during the operation utilizing coiled tubing 30. As described in greater detail below, the high-cycle, low-load fatigue damage may be calculated through the use of stress transfer functions.

Figure 2:
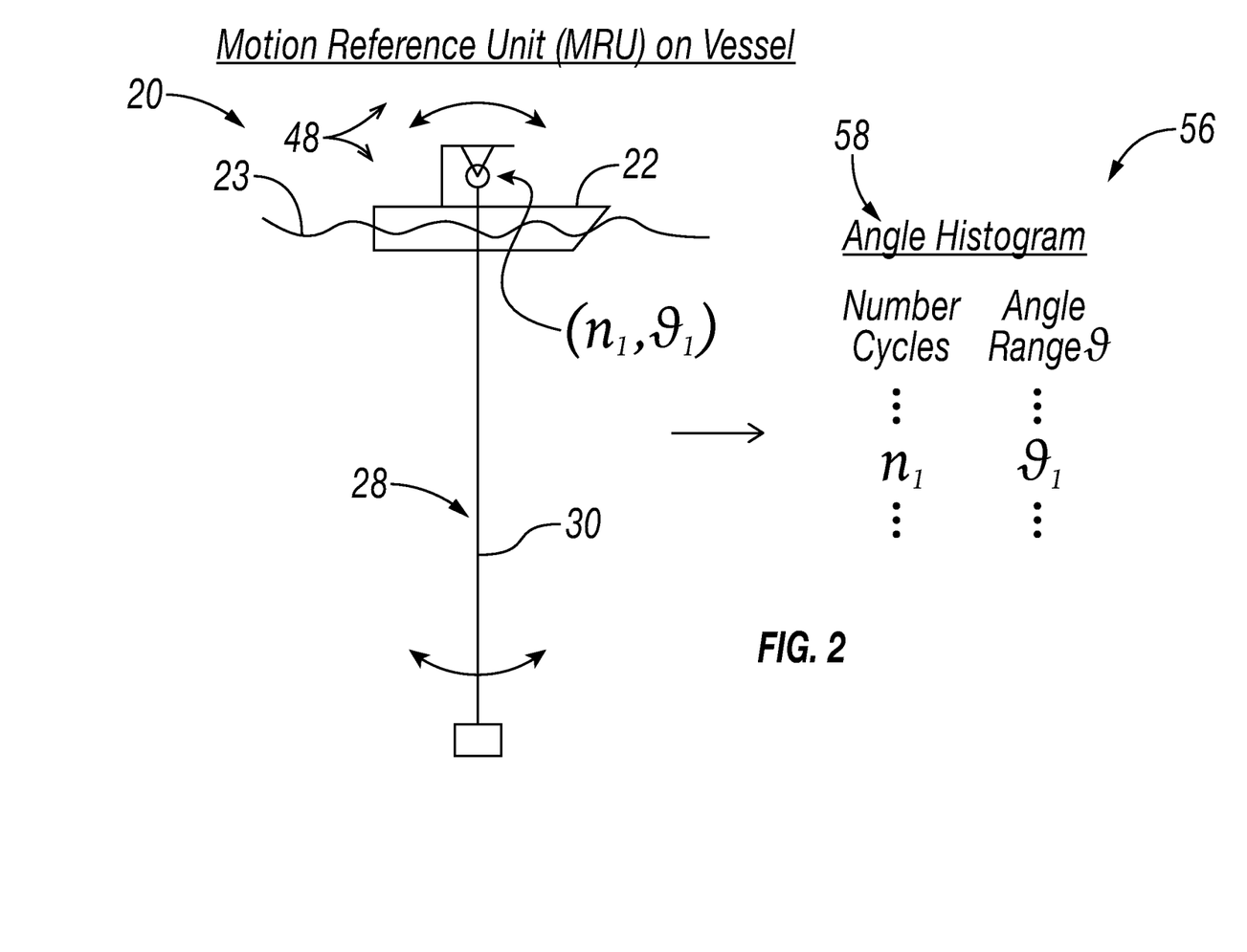
FIG. 2 is a schematic illustration of a model for computing conduit bend angle from measurements provided by a sensor package, e.g. a motion reference unit, according to an embodiment of the disclosure.
Figure 3:
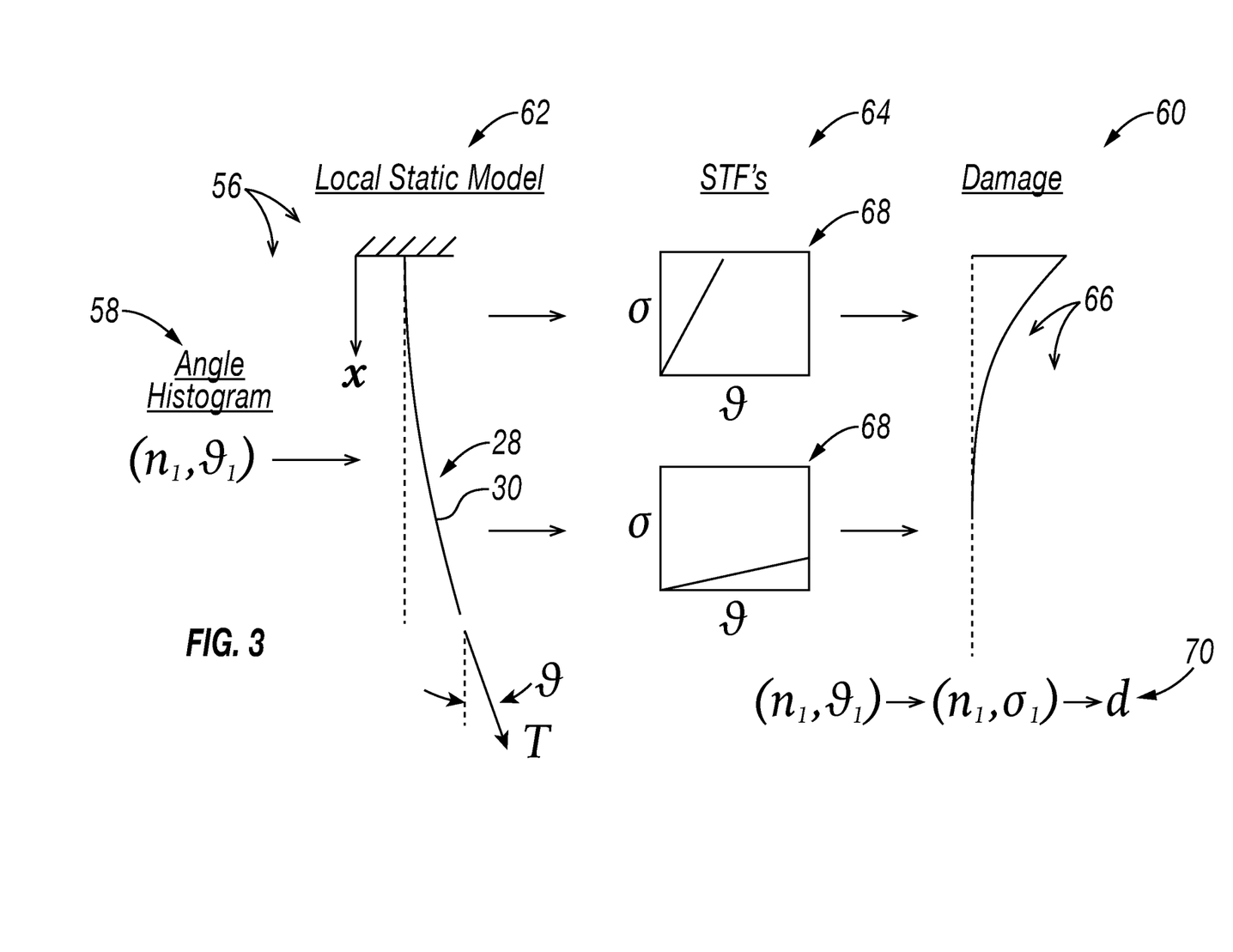
FIG. 3 is a schematic illustration of a model for computing conduit fatigue from a conduit bend profile, e.g. from conduit bend angle data by using stress transfer functions, according to an embodiment of the disclosure.

Referring generally to FIGS. 1-3, an embodiment of a methodology for determining fatigue damage may be described. In this description, coiled tubing 30 is described for purposes of explanation but the same approach may be used for other types of flexible conduits 28. The total fatigue of coiled tubing 30 is a combination of both functional loading (e.g. spooling on and off the reel, certain types of tensile loading, and pressure loading) and environmental loading (e.g. oscillations caused by surface vessel 22). The total fatigue may generally be summarized according to the equation:

$$F_D = (F_{LCHL} + F_{HCLL}) \times FOS$$

where $F_D$ is total fatigue damage; $F_{LCHL}$ is a function of low-cycle, high-load induced fatigue referred to as functional loading; $F_{HCLL}$ is a function of high-cycle, low-load induced fatigue referred to as environmental loading; and FOS is a factor of safety.

In the equation above, the environmental ($F_{HCLL}$) effects have not been well known in the past with respect to flexible conduit 28/coiled tubing 30 in open water deployment. However, the illustrated embodiment enables monitoring of vessel motions (e.g. heave, pitch, roll, yaw) via the sensor package/MRU 48 to obtain data on the environmental effects. The data may be sent from the sensor package/MRU 48 to the computer system 50 so the data may be processed to determine a flexible conduit bend profile 56, as illustrated in FIG. 2.

By way of example, the computer system 50 may be used to establish a flexible conduit bend profile 56 in the form of a representative bending angle histogram 58. The bending angle histogram 58 may be based on the environmentally induced bending of coiled tubing 30 due to the movement of surface vessel 22 as monitored by sensor package 48. Once the flexible conduit bend profile 56 is established, the profile 56 may be processed further via computer system 50 based on mathematical relationships between bending and induced stress to provide a flexible conduit fatigue profile 60 (see FIG. 3). For example, the representative bending angle histogram 58 may be used to establish a local static model 62 to which mathematical relationships 64 are applied to generate the flexible conduit fatigue profile 60, e.g. to generate a stress histogram 66. According to an embodiment, the applied mathematical relationships 64 may comprise application of a stress transfer function or stress transfer functions 68 to the flexible conduit bend profile 56 to establish the flexible conduit fatigue profile 60.

In some embodiments, the bending angle histogram 58 comprises a matrix having indexes corresponding to particular locations along the axial length of the coiled tubing 30. Each index of the matrix corresponding to a location along the coiled tubing 30 is correlated with an estimated bending of the coiled tubing 30 at that location. This results in the flexible conduit, e.g. coiled tubing, bend profile 56. In some embodiments, the stress transfer functions 68 may be used to evaluate more than bending angle when providing the fatigue profile 60. Other data such as the size of the flexible conduit 28, deployed length of the flexible conduit 28, material of the flexible conduit 28, tension applied to the flexible conduit 28, type of bend stiffener 40, temperature of the bend stiffener 40, and/or other suitable data may be collected by sensor package 48/sensors 53 to determine the flexible conduit bend profile 56. The bend profile 56 may then be applied to estimate the flexible conduit fatigue profile 60.

Referring again to FIG. 2, for some embodiments it may be assumed the coiled tubing 30 is held in a substantially vertical position beneath the surface vessel 22 due to the coiled tubing 30 being placed in tension as equipment is deployed to the well 42. In some applications, for example, heavy downhole equipment may be coupled to a lower terminal end of the coiled tubing 30 and the weight of the equipment places the coiled tubing 30 in tension.

With this assumed vertical arrangement of the coiled tubing 30, movement by the surface vessel 22 is translated into bending of the coiled tubing 30 as part of the impartation of high-cycle, low-load stressing of the coiled tubing 30. Because a portion of the coiled tubing 30 positioned at or near the surface vessel 22 is held static relative to the surface vessel 22 (i.e. at the hang-off location), bending of the coiled tubing 30 resulting from motion of the surface vessel 22 may be highest at a location just below the hang-off location. Thus, bending of the coiled tubing 30 due to motion of the surface vessel 22 may, in fact, be highest at a location within bend stiffener 40.

By using such an assumption regarding behavior of the coiled tubing 30, the movement data of the sensor package/ MRU 48 may be utilized to estimate bending of the coiled tubing 30 at a plurality of locations along the axial length of the coiled tubing 30. Furthermore, other parameters beyond the movement data may be used to estimate bending and/or fatigue of the coiled tubing 30 (or other flexible conduit 28) at a plurality of locations along the axial length of the coiled tubing 30.

It should be noted the sensor package 48 may incorporate various other types of sensors 53 to obtain additional data; or separate systems may be used in combination with computer system 50 to obtain additional data on, for example, functional loading. The additional data may comprise functional loading related data, e.g. data based on reeling and unreeling the coiled tubing 30. Examples of such separate systems for monitoring functional loading/functional fatigue data include the Cerberus™ software package and the CoilLIFE™ software module available from Schlumberger Corporation. Such software may be uploaded to computer system 50 and used to enhance accuracy of bending and fatigue estimates. For example, additional sensors may be used with such coiled tubing management systems to obtain and utilize data related to functional loading in addition to environmental loading.

This allows computer system 50 to also be used to provide information related to plastic deformation of the coiled tubing 30 as the coiled tubing is reeled and/or unreeled. The flexible conduit fatigue management system 26 may be used to obtain and process data related to both functional fatigue and environmental fatigue. For example, the fatigue management system 26 may be used to obtain and process data regarding tension in the coiled tubing 30, position of the coiled tubing 30, and pressure within the coiled tubing 30 which can cause elastic deformation of the coiled tubing.

In other embodiments, resonance of the coiled tubing 30 due to interaction between the coiled tubing 30 and currents in the sea may cause vortex induced vibration (VIV) to the coiled tubing 30 which can cause additional fatigue. The fatigue management system 26 and sensor package 48 may include sensors 53 to monitor the VIV so as to provide data which can be used in determining overall fatigue of the coiled tubing 30 (or other flexible conduit 28). Sensors 53 also may be positioned to monitor the circumferential position, e.g. twisting, of the coiled tubing 30 so as to obtain data for further enhancing the bending and fatigue estimates obtained and provided by the fatigue management system 26. An example of a circumferential position measuring system is described in US 2014/0207390. Accordingly, data may be collected with respect to both environmental loading and functional loading; and this data may be processed by computer system 50 to determine fatigue estimates, e.g. environmentally based fatigue estimates or total fatigue estimates including the environmental effects.

Referring generally to FIG. 3, the stress histogram 66 may be used to determine fatigue damage due to environmental effects, e.g. environmental loading. For example, a DNV (Det Norske Veritas AS) S-N curve (stress range plotted against number of cycles to failure) approach may be used to calculate fatigue damage (d) (see reference numeral 70) for each stress bin at a fixed coiled tubing section (denoted x) and the calculated fatigue damage across the length of the coiled tubing may be determined and presented. Although the fatigue damage is illustrated as increasing exponentially moving towards an upper end of the coiled tubing 30, the distribution of fatigue damage along the axial length of the coiled tubing 30 may vary depending on the actual operation, system and methodology.

The open water (high-cycle, low-load) induced environmental fatigue may be combined with the normal functional fatigue (low-cycle, high-load), e.g. spooling induced functional fatigue. The functional fatigue calculations may be provided by suitable coiled tubing management systems as described above, e.g. the Cerberus' software package and the CoilLIFE™ software module available from Schlumberger Corporation. The environmental fatigue due to environmental loading and the functional fatigue due to functional loading may be monitored and recorded to determine the overall coiled tubing useful life, thus enabling an improved fatigue management of the coiled tubing.

In some embodiments, the fatigue management system 26 works with peripheral device 52 to automatically provide feedback alarms when fatigue damage along coiled tubing 30 (or other flexible conduit 28) reaches a predetermined set level. For example, a feedback alarm may be provided when the fatigue damage at an area of high cycle loading reaches a predetermined set level.

The alarm or alarms may be provided in several forms. For example, messages may be provided to operators instructing them to further spool out the coiled tubing 30 when the fatigue damage reaches an initial predetermined level, e.g. 50% of allowable fatigue life inclusive of a factor of safety. In another example, the alarm may provide messages instructing the operator to recover the entire coiled tubing 30 when too much tubing has been paid out or when the fatigue damage at a certain point along the coiled tubing 30 reaches a secondary predetermined level, e.g. 75% of allowable fatigue life inclusive of a factor of safety.

Due to the high degree of bending of coiled tubing 30 occurring at or in proximity to bend stiffener 40, extending the coiled tubing 30 farther out from reel 34 in response to the fatigue damage reaching an initial predetermined level can be used to limit the stress applied to a specific region of the coiled tubing 30. For example, portions of the coiled tubing 30 exposed to excessive bending proximate bend stiffener 40 may be extended to a lower position where bending is reduced, thus reducing the amount of stress applied to that specific section of coiled tubing 30. In some embodiments, a final alarm may be provided via, for example, peripheral device 52 when fatigue damage reaches a specific predetermined high-level indicating the coiled tubing 30 should be recovered to the surface.

It should be noted other types of fatigue damage calculations may be used instead of stress cycling evaluations. For example, fatigue damage calculations may be made according to a strain cycle approach. Generally, strain cycle calculations may utilize a similar methodology to that described above for determining fatigue damage of the coiled tubing 30. However, this latter method may allow for improved combination of functional loading and environmental loading in some applications.

Additionally, various techniques may be used for determining the angle histogram 58 of the coiled tubing 30 relative to the vessel normal. Such techniques may include optical methods to determine coiled tubing position/shape and subsequent angle of deflection. Other techniques may comprise direct measurement of the coiled tubing position via the use of location sensors/transducers. In another example, the technique may comprise direction measurement of coiled tubing strain which may be determined via direct evaluation of the strain or shape of the bend stiffener 40. Accordingly, various techniques may be used for calculating fatigue damage and for monitoring bend profiles.

Figure 4:
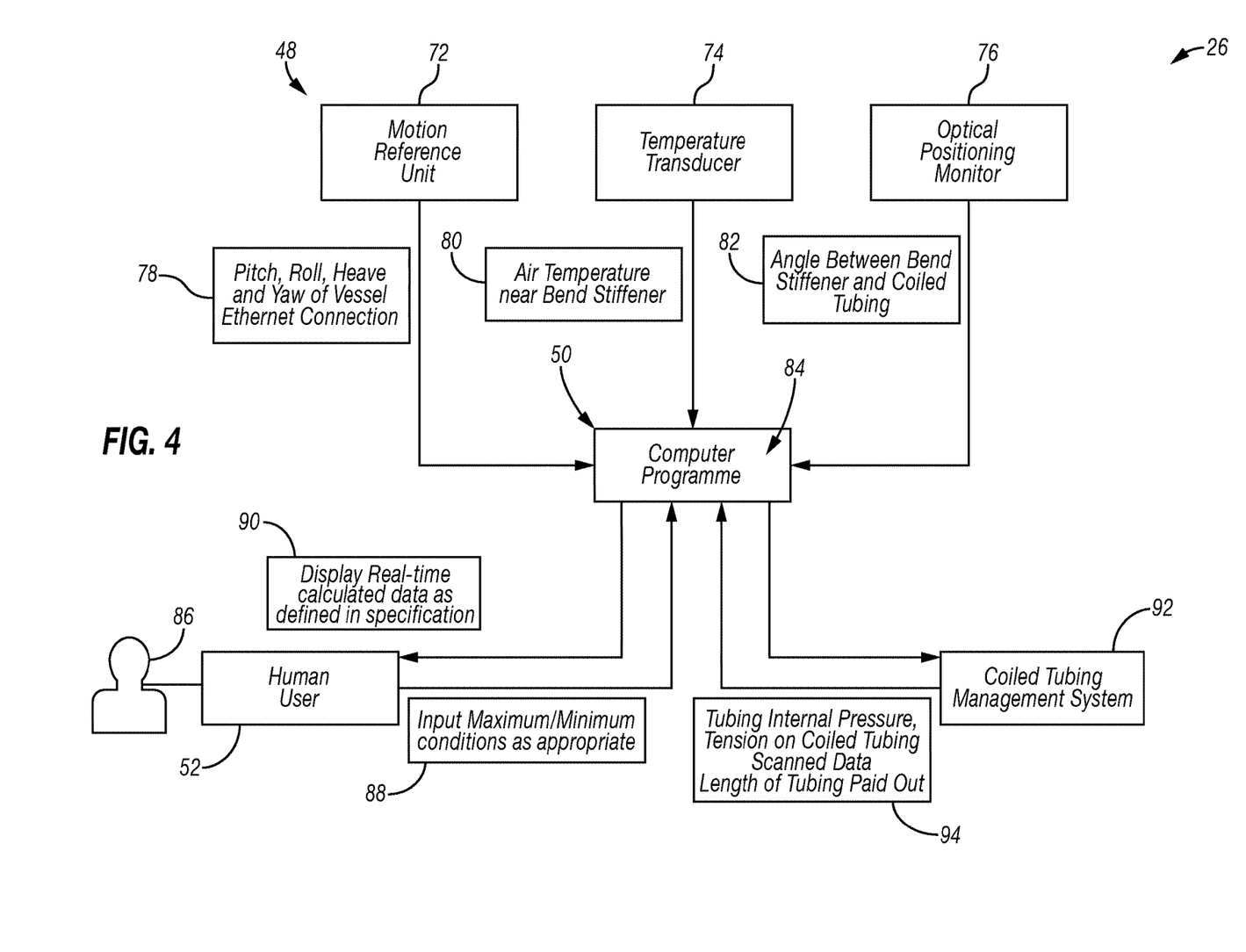
FIG. 4 is a block diagram of an example of a fatigue management system, according to an embodiment of the disclosure.

Referring generally to FIG. 4, a block diagram is provided as a representation of fatigue management system 26. In this embodiment, fatigue management system 26 generally comprises sensor package 48 which may be in the form of or comprise a motion reference unit (MRU) 72. In some embodiments, the sensor package 48 also may comprise other types of sensors 53, e.g. pressure sensors, temperature sensors, tensile loading sensors, position sensors, spool out monitoring sensors. In the example illustrated in FIG. 4, sensors 53 include a temperature transducer 74 and an optical positioning monitor 76. By way of example, the MRU 72 may be used for measuring pitch, roll, heave, and yaw of the surface vessel 22 and may be coupled with computer system 50 via an ethernet connection or other suitable connection, as referenced by block 78. The temperature transducer 74 may be used for measuring air temperature near or within the bend stiffener 40, as referenced by block 80. The optical positioning monitor 76 may be used for optically measuring the angle between the bend stiffener 40 and the coiled tubing 30, as referenced by block 82.

Data from sensor package 48, (e.g. from MRU 72, temperature transducer 74, and optical positioning monitor 76) may be fed to processor-based computer system 50 which may comprise a computer program or programs 84. The computer system 50 also may enable interaction with a human user 86 via, for example, peripheral device 52 in communication with computer system 50. In some applications, the computer system 50 may be operatively coupled with flexible conduit system 24 and programmed to automatically perform a corrective action, e.g. unspooling or spooling of the flexible conduit 28 based on fatigue determinations.

The peripheral device 52 enables the human user 86 to input instructions or other data to computer system 50. For example, the peripheral device 52 may be used to input predetermined fatigue level values for providing alarms or other useful information, as represented by block 88. Additionally, the computer system 50 may output, via peripheral device 52, various fatigue level information, alarms, and other desirable information, as represented by block 90. This data may be provided in real-time based on data received from sensor package 48.

Furthermore, the computer system 50 may enable communication with a coiled tubing management system 92. By way of example, the coiled tubing management system 92 may comprise a suitable coiled tubing management system, such as one of the management systems described above, for managing fatigue due to functional loading. Thus, coiled tubing management system 92 may be used to provide data on coiled tubing internal pressure, tension in the coiled tubing 30, size of the coiled tubing 30, and length of the coiled tubing paid out, as represented by block 94. The coiled tubing management system 92 may be placed in communication with computer system 50 to supplement environmental loading/fatigue management calculations with functional loading/fatigue calculations to enable determination of an overall coiled tubing fatigue. It should be noted the same approach may be used with other types of flexible conduits 28.

In some embodiments, fatigue management system 26 also may comprise an uninterruptible power system (UPS). The UPS enables continued monitoring of the coiled tubing 30 (or other flexible conduit 28) in the event a power failure occurs on the surface vessel 22.

Figure 5:
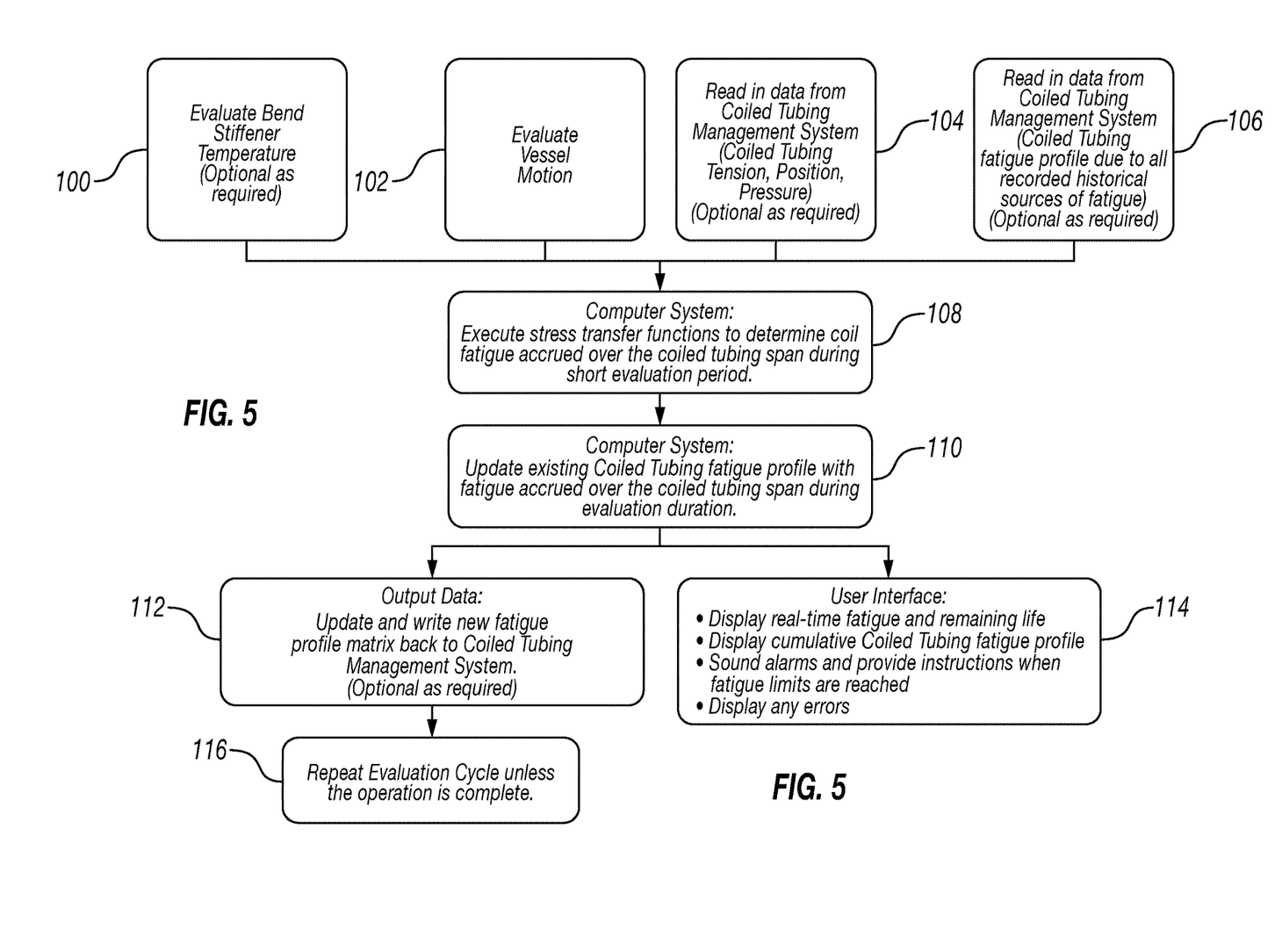
FIG. 5 is a flow chart of an example of a method for managing flexible conduit fatigue, according to an embodiment of the disclosure.

Referring generally to FIG. 5, a flow chart is provided to illustrate a methodology for managing fatigue of a flexible conduit 28, e.g. coiled tubing 30, via fatigue management system 26. In this embodiment, data is collected via sensor package 48 for processing via computer system 50. For example, temperatures of the bend stiffener 40 may be collected and monitored, as represented by block 100. Additionally, motion of surface vessel 22 may be monitored via, for example, MRU 72, as represented by block 102.

By way of further example, data may be provided to fatigue management system 26 by coiled tubing management system 92, as represented by block 104. Examples of data provided by coiled tubing management system 92 may include coiled tubing tension, coiled tubing position, pressure in the coiled tubing, and/or other functional loading data. The coiled tubing management system 92 also may be used to provide a coiled tubing fatigue profile, as represented by block 106. Data in the coiled tubing fatigue profile may include recorded historical sources of fatigue, e.g. high-cycle, low-load fatigue and low-cycle, high-load fatigue.

Although the embodiment illustrated and described with reference to FIG. 5 refers to a coiled tubing fatigue profile, the fatigue profile also may be determined and utilized for other types of flexible conduit 28. If flexible conduit 28 comprises flexible cable, for example, a flexible cable bend profile and flexible cable fatigue profile may be determined according to the methodology described herein.

The data from blocks 100, 102, 104, 106 as well as additional and/or other types of data may be provided to computer system 50, as represented by block 108. The computer system 50 may be used to execute stress transfer functions for converting a coiled tubing bend profile to a coiled tubing fatigue profile. The coiled tubing fatigue may be accrued over the length of the coiled tubing, e.g. at a plurality of axial positions or lengths of coiled tubing 30, during a short evaluation period as further represented in block 108. The computer system 50 may be used to automatically update this coiled tubing fatigue profile, as represented by block 110, based on the data from block 108 as the data is repeatedly or continuously received.

For example, the coiled tubing fatigue accrued over the length of the coiled tubing 30 during evaluation periods represented in block 108 may be updated over longer periods of time to monitor coiled tubing fatigue, as represented by block 110. The output of data represented by block 110 may be used to update and prepare a new fatigue profile matrix, as represented by block 112. This new fatigue profile matrix data may be repeatedly input to the fatigue management system 26 as represented by blocks 104 and 106.

As represented by block 114, the output from block 110 may be used to display real-time fatigue and remaining life of the tubing via, for example, peripheral device 52. As further represented by block 114, the output from block 110 may be used to display a cumulative coiled tubing fatigue profile, to sound alarms and provide instructions to a human user when fatigue limits are reached, to display errors, and/or to display other information related to fatigue management of the coiled tubing 30/flexible conduit 28.

In some embodiments, the information represented by block 114 may be displayed via a graphical user interface (GUI), e.g. a touchscreen panel, and may include various types of information related to real-time fatigue and remaining life of the coiled tubing 30/flexible conduit 28. The display data also may include fatigue profiles for the entire length of the coiled tubing 30/flexible conduit 28. The GUI also is useful for providing various levels of alarms based on reaching predetermined fatigue limits, rates of fatigue, errors, or other information, e.g. instructions regarding performance of actions based on the flexible conduit fatigue profile. The fatigue evaluation cycle may be repeated for additional evaluation periods until the coiled tubing operation or other flexible conduit operation is finished, as represented by block 116.

The fatigue management system 26 may be used in cooperation with various coiled tubing deployment equipment or other types of flexible conduit deployment equipment. Furthermore, the fatigue management system 26 may comprise various types of sensor packages having different types of sensors for acquiring desired data. This data may then be processed according to various programs via computer system 50 to determine both flexible conduit bend profiles and flexible conduit fatigue profiles. The flexible conduit bend profiles and flexible conduit fatigue profiles may be based on environmental loading or a combination of environmental loading and functional loading. Furthermore, the data may be output to one or more peripheral devices of various types so as to provide alarms regarding fatigue limits or to provide other useful information for facilitating fatigue management of a given flexible conduit in a subsea operation.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A flexible conduit fatigue management system, comprising:
a sensor package which is positioned to measure a motion of a surface vessel so as to obtain environmental loading data, which induces high-cycle, low-load fatigue on a flexible conduit, while the surface vessel is coupled with the flexible conduit extending below a sea surface;
a computer system in communication with the sensor package, the computer system producing a flexible conduit bend profile of the flexible conduit from the environmental loading data and the computer system applying a stress transfer function to the flexible conduit bend profile to establish a flexible conduit fatigue profile,
wherein the flexible conduit bend profile comprises a matrix having a plurality of indexes corresponding to particular locations along an axial length of the flexible conduit, each index of the plurality of indexes is correlated with an estimated bending of the flexible conduit at the particular location corresponding to the index, and
wherein the stress transfer function executed to determine a flexible conduit fatigue accrued over the flexible conduit span during short evaluation period; and
a peripheral device in communication with the computer system, the peripheral device having an output device to output an alarm in response to the flexible conduit fatigue profile exceeding a predetermined limit.

2. The flexible conduit fatigue system as recited in claim 1, wherein the computer system determines the flexible conduit fatigue profile based at least in part on fatigue imparted to the flexible conduit from plastic deformation of the flexible conduit and elastic deformation imparted to the flexible conduit from pressure variations within the flexible conduit.

3. The flexible conduit fatigue system as recited in claim 1, wherein the peripheral device is operable to input the predetermined limit.

4. The flexible conduit fatigue system as recited in claim 1, wherein the sensor package comprises an optical positioning sensor to measure the position of the flexible conduit.

5. The flexible conduit fatigue system as recited in claim 1, wherein the sensor package comprises a temperature transducer to measure a temperature of a bend stiffener through which the flexible conduit is conveyed from the surface vessel.

6. The flexible conduit fatigue system as recited in claim 1, wherein a strain cycle calculation is performed by the computer system to provide the flexible conduit fatigue profile.

7. The flexible conduit fatigue system as recited in claim 1, wherein the sensor package comprises a motion reference unit.

8. The flexible conduit fatigue system as recited in claim 1, wherein the flexible conduit bend profile comprises a coiled tubing bend profile and the flexible conduit fatigue profile comprises a coiled tubing fatigue profile.

9. The flexible conduit fatigue system as recited in claim 1, wherein the flexible conduit bend profile comprises a flexible cable bend profile and the flexible conduit fatigue profile comprises a flexible cable fatigue profile.

10. The flexible conduit fatigue system as recited in claim 1, wherein the computer system produces the flexible conduit bend profile based on measurements of a size of the flexible conduit, a deployed length of the flexible conduit, and tension applied to the flexible conduit.

11. The flexible conduit fatigue system as recited in claim 1, wherein the computer system produces the flexible conduit bend profile in real time.

12. A method for managing flexible conduit fatigue, comprising:
providing a sensor package in communication with a computer system, wherein the sensor package is positioned to measure a motion of a surface vessel and to obtain environmental loading data, which induces high-cycle, low-load fatigue on a flexible conduit, while the surface vessel is coupled with the flexible conduit extending below a sea surface;
measuring movement of the surface vessel to obtain movement data which induces high-cycle, low-load fatigue within an elastic material yield region of the flexible conduit;
using a computer-based data processing system to process the movement data to obtain a processed movement data;
determining a flexible conduit bend profile based on the processed movement data;
providing a flexible conduit fatigue profile by applying a stress transfer function to the flexible conduit bend profile, wherein the flexible conduit bend profile comprises a matrix having a plurality of indexes corresponding to particular locations along an axial length of the flexible conduit, each index of the plurality of indexes is correlated with an estimated bending of the flexible conduit at the particular location corresponding to the index, and
wherein the stress transfer function executed to determine a flexible conduit fatigue accrued over the flexible conduit span during short evaluation period; and
adjusting a use of the flexible conduit based on the flexible conduit fatigue profile.

13. The method as recited in claim 12, wherein determining the conduit bend profile comprises processing data based on measurements of a temperature of a bend stiffener, a size of the conduit, a deployed length of the conduit, and tension applied to the conduit.

14. The method as recited in claim 12, further comprising using a peripheral device operatively coupled with the computer based data processing system to output an alarm in response to the conduit fatigue profile exceeding a predetermined limit.

15. The method as recited in claim 12, wherein the measuring movement of the surface vessel comprises using a motion reference unit.

16. A method, comprising:
providing a sensor package in communication with a computer system, the sensor package is positioned to measure a motion of a surface vessel, the surface vessel is coupled with a flexible conduit extending below a sea surface;
using a sensor package to obtain data related to the flexible conduit based on a combination of functional loading, which induces low cycle, high-load fatigue, and real-time environmental loading due to movement of the surface vessel, the real-time environmental loading inducing relatively higher-cycle, lower-load fatigue;

processing the data from both the functional loading and the real-time environmental loading, via a computer system, to determine a flexible conduit bend profile;

converting the flexible conduit bend profile to a flexible conduit fatigue profile applying a stress transfer function to the flexible conduit bend profile wherein the flexible conduit bend profile comprises a matrix having a plurality of indexes corresponding to particular locations along an axial length of the flexible conduit, each index of the plurality of indexes is correlated with an estimated bending of the flexible conduit at the particular location corresponding to the index, and wherein the stress transfer function executed to determine a flexible conduit fatigue accrued over the flexible conduit span during short evaluation period; and outputting information related to the flexible conduit fatigue profile to an output device to indicate a condition of the flexible conduit.

17. The method as recited in claim 16, wherein the outputting information comprises outputting an alarm regarding fatigue life of the flexible conduit.

* * * * *